Figure 8:
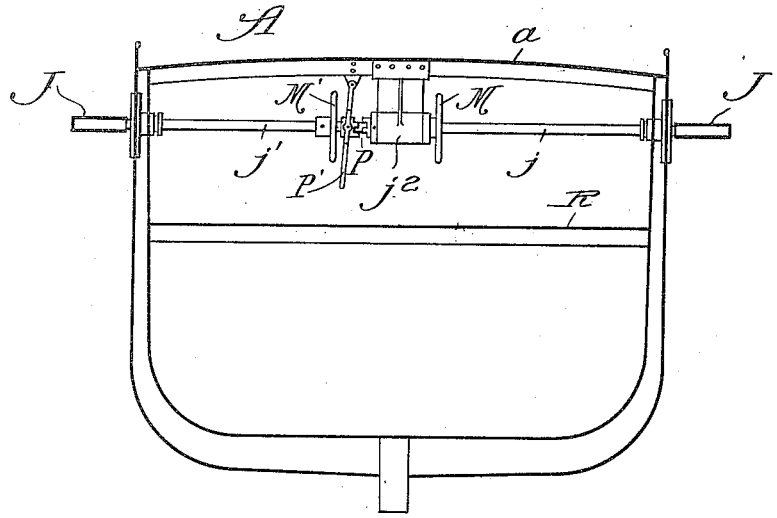

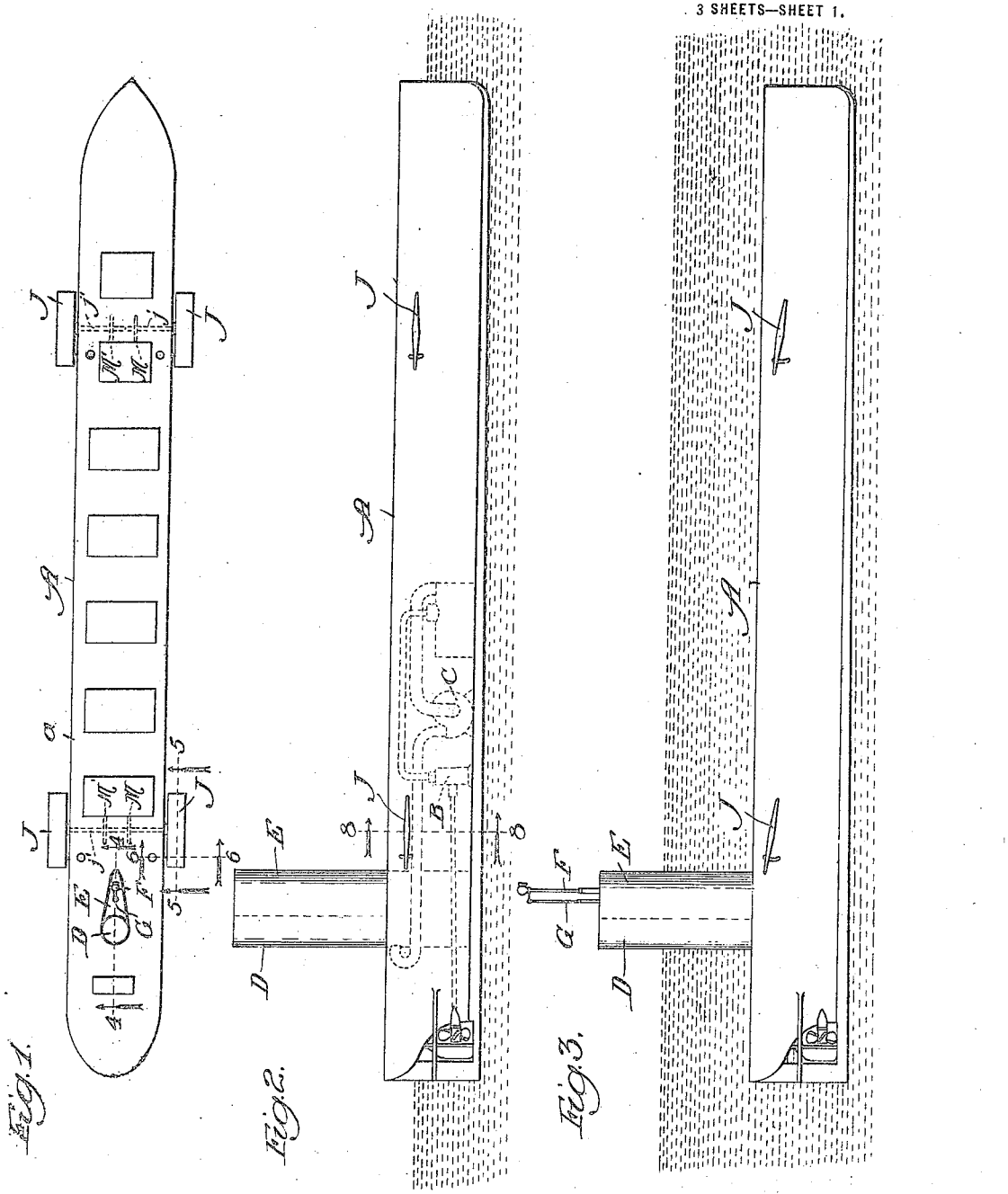

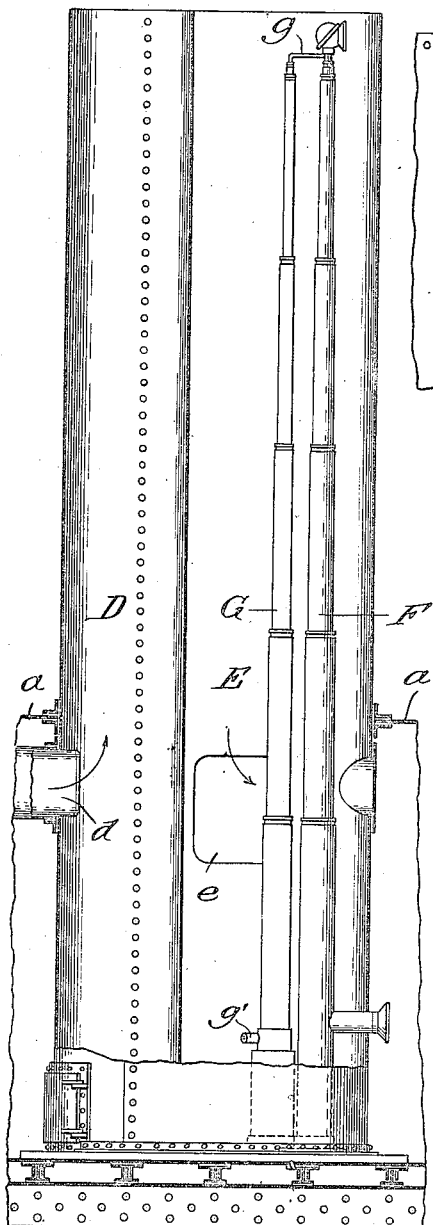
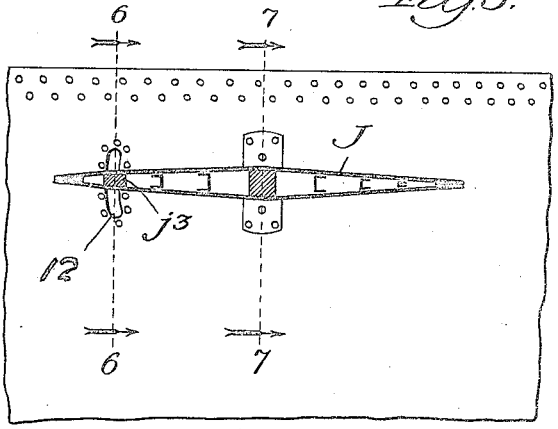
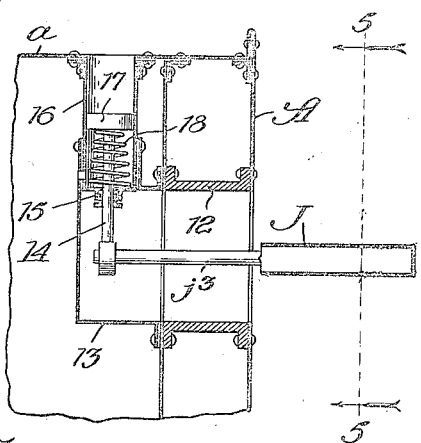
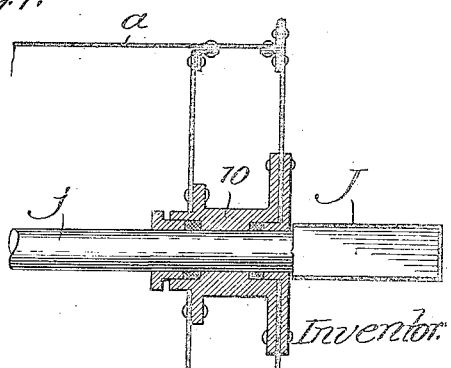

W. M. LE MOYNE.
SHIP FOR SUBMARINE NAVIGATION.
APPLICATION FILED FEB. 5, 1918.

1,426,882.

Patented Aug. 22, 1922.
3 SHEETS—SHEET 3.

UNITED STATES PATENT OFFICE.

WILLIAM M. LE MOYNE, OF CHICAGO, ILLINOIS.

SHIP FOR SUBMARINE NAVIGATION.

1,426,882. Specification of Letters Patent. Patented Aug. 22, 1922.

Application filed February 5, 1918. Serial No. 215,444.

*To all whom it may concern:*

Be it known that I, WILLIAM M. LE MOYNE, a citizen of the United States, and a resident of Chicago, in the county of Cook and State of Illinois, have invented certain Improvements in Ships for Submarine Navigation, of which I do declare the following to be a full, clear, and exact description, reference being had to the accompanying drawings, forming a part of this specification.

The object of the present invention is to provide a ship, more especially designed for freight carrying purposes, and of such character that it may travel for a distance limited only by its fuel supply either upon the surface of the water in the usual manner or submerged at such distance below the surface as to be free from the strains incident to surface wave action and measureably free, also, in time of war from attacks by submarine war craft.

It is a fact generally recognized by marine engineers that the most serious obstacle to the use of submarine ships, especially for cargo-carrying purposes, is that dual power system of propulsion is regarded as essential, i. e., one power system, such as a gasoline, oil or steam engine for surface navigation, and another power system, such as electric motor and storage batteries for submerged navigation. With such dual power system of propulsion, it is found in practice that the weight of the main engine (amounting to about 8% of the total weight of the ship), and the space occupied by such engine is utterly wasted, so far as any advantage to the submerged travel of the ship is concerned, while on the other hand, when the ship is traveling upon the surface, the weight of the storage batteries, the electric motors and their accessories (amounting to about 16% of the total weight of the ship) are of no value. Hence it is that even when the tonnage of the ship is vastly increased, the space for cargo-carrying purposes is necessarily very small. Moreover, the use of storage batteries for submerged navigation permits the ship to travel for a very limited time only under water, as it is necessary at short intervals to bring the ship to the surface in order that the batteries may be recharged.

To overcome the objections incident to the dual power system of propelling ships designed for both surface and submarine navigation, my invention contemplates the use of a single power system (preferably a steam engine) whereby the propulsion of the ship may be effected for distances unlimited save by the fuel supply, either when traveling afloat or submerged. My invention consists primarily in providing a submarine or submersible ship with a single power plant or system (preferably steam) and with elongated pipes of such length as to permit the ship to travel submerged with said pipes extending above the water surface and of such size as to afford a copious supply of fresh air and discharge the products of combustion and foul air.

My invention further consists in the features of novelty hereinafter described, illustrated in the accompanying drawings and particularly pointed out in the claims at the end of this specification.

Figure 9:
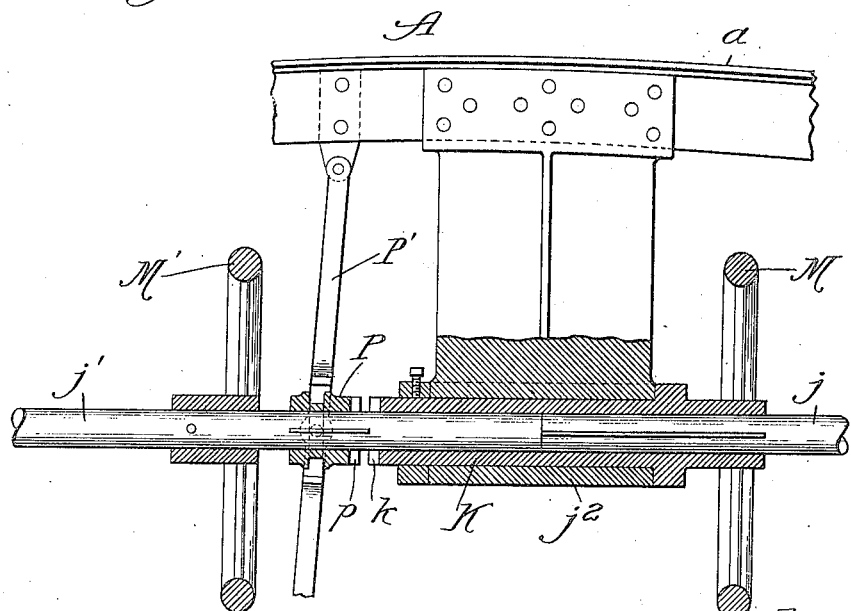

Fig. 1 is a plan view of a ship embodying my invention. Fig. 2 is a view in side elevation showing the ship in position to travel upon the surface of the water in usual manner. Fig. 3 is a view similar to Fig. 2 but showing the ship as submerged. Fig. 4 is an enlarged detail view, with parts broken away, of the stationary stack through which smoke from the engine, foul air, etc., will be discharged, through which the air supply may be received and through which the periscope may be manipulated. Fig. 5 is an enlarged detail view on line 5—5 of Fig. 6. Fig. 6 is a view in vertical section on the line 6—6 of Fig. 5. Fig. 7 is a view in vertical section on line 7—7 of Fig. 5. Fig. 8 is an enlarged view in vertical section on line 8—8 of Fig. 2. Fig. 9 is a detail view upon an enlarged scale of parts shown in Fig. 8.

The hull A of the ship will preferably be of the type commonly employed for freight carrying purposes, the hull being furnished with the usual hatches provided with covers whereby they may be tightly closed and sealed. Indeed, one of the purposes of my invention is to enable the ordinary freight vessel to be readily converted into one that may travel either upon the surface of the water in the usual manner or submerged to such extent as to be free from the strains incident to wave action. In adapting ordinary cargo-carrying ships for the practice of my invention, care must, of course, be taken that the hulls are properly braced to resist the pressure incident to submergence.

The hull will be provided with a suitable engine,—preferably a steam engine, as indicated at B and will be furnished with the usual propeller or propellers located adjacent the keel of the hull and with the usual rudder and steering mechanism.

The hull A will be supplied with the usual water tanks, compressed air tanks, pumps and like equipment for submerging purposes, but as these may be of any well known construction, I have not deemed it necessary to illustrate them in the drawings.

The single power plant or system by which the ship will be propelled when traveling either afloat or submerged may consist of a steam engine B of the turbine or other suitable type. As shown, the engine is furnished with a forced draft apparatus, such as a blower C, that will serve not only to drive off the products of combustion, exhaust steam and foul air through the pipe $d$ that leads to the smokepipe D, but also to draw in a copious supply of fresh air. Preferably, the fresh air supply is admitted through a port $e$ from the stack or pipe E that rises through the deck $a$ of the hull, this stack E, like the pipe D, being open at its top. In the preferred embodiment of my invention, the smokepipe D is inclosed within the stack E and this stack is preferably of oval shape in cross section, its major axis extending lengthwise of the hull, as seen in Fig. 1. The upper portion of the stack E should be so painted or otherwise "camouflaged" as to obscure its visibility as far as possible, and suitable stay rods or cables (not shown) may lead from the stack to the deck.

Preferably, the periscope F will be located within the stack E, this periscope being of any approved type. As shown, the periscope F comprises extensible sections whereby it may be raised and lowered, as by means of an extensible hydraulic pipe G that is connected, as at $g$ to the periscope adjacent its upper end, this pipe G being furnished with a suitable fluid admission and discharge pipe $g'$. The placing of the pipe G within the stack E is advantageous, as by this arrangement the pipe and stack brace each other and the friction incident to the impact of water upon these parts is lessened when the ship is traveling submerged. So, also, the location of the periscope within the stack G is desirable, as the stack thus serves to protect and give greater stability to the periscope. When the ship is traveling upon the surface, the periscope may be contracted as shown in Fig. 4.

The stack E and the pipe D will be of such length (say about 45 feet above the deck $a$) that when the ship is traveling submerged and in the area of still water, say at the depth of 35 feet, the pipe and stack will extend sufficiently above the surface to avoid shipping water. If desired, the upper ends of the stack and pipe may be provided with splash valves, although I do not regard this as essential.

In the embodiment of my invention shown in the accompanying drawings, the hull A is provided at each side and adjacent its bow and stern with planes or fins J, whereby the desired depth of submergence of the hull may be maintained. The fins J are shown as fixed to the outer ends of the shaft sections $j$ and $j'$, the inner ends of these shaft sections being conveniently supported, as by a hanger bearing $j^2$ depending from the deck $a$ of the hull (see Figs. 8 and 9). As shown, more particularly in Fig. 9, the abutting ends of the shaft sections $j$ and $j'$ are carried by a sleeve K within the hanger bearing $j^2$, this sleeve K being splined or keyed to one of the shaft sections $j$. Upon one end of the sleeve K is mounted a hand-wheel M whereby the shaft section $j$ may be turned to manipulate the corresponding fin J, and upon the other shaft section $j'$ is fixed a hand-wheel M' whereby the fin J at the outer end of the shaft section $j'$ may be turned. Preferably, one end of the sleeve K is furnished with clutch teeth $k$ and there is a clutch member P having teeth $p$ to engage the teeth $k$, this clutch member P being splined to the shaft section $j'$ and being slidable thereon and adapted to be controlled by a hand lever P' within convenient reach of an operator standing upon the platform R. When the clutch member P is disengaged from the sleeve K, as illustrated in Fig. 9, either of the shaft sections $j$ or $j'$ can be turned by means of the hand-wheel M or M', and when the clutch member P is in engagement with the sleeve K, both shaft sections $j$ and $j'$ may be turned by either the hand-wheel M or M', the shaft sections and the fins J carried thereby being thus caused to move in unison. The outer portions of the shaft sections pass through suitable stuffing boxes 10 in the side of the hull.

To the rear portion of each of the fins J is connected a rod $j^3$ (see Fig. 6) that passes through an oblong housing 12 in the side of the hull A and into a correspondingly shaped casing 13 attached to the inner wall of the hull. To the inner end of this rod $j^3$ is connected the lower end of a rod 14 that passes upwardly through a stuffing box 15 in the bottom of the casing 16, the upper end of which connects with an opening formed in the deck $a$. Within the casing 16 is mounted a piston 17 that is secured to the upper end of the rod 14 and between the piston 17 and the stuffing box 15 of the casing 16 is arranged a coil spring 18 the purpose of which is to exercise a pressure upon the piston 17 in opposition to the pressure of the water upon the outer face of the piston when the hull is submerged.

The purpose of the fins J is to insure the proper submergence of the hull A, and it will be understood that when the front ends of the fins J are inclined downward below the horizontal, as shown in Fig. 3, and the hull is submerged, the forward motion of the hull through the water will cause the fins to force the hull downward to an extent corresponding to the angle of inclination of the fins.

In order to automatically maintain the fins J with their front ends inclined downwardly at the desired angle, I have provided the pistons 17 and the springs 18 arranged within the casing 16, as hereinbefore described. It will be understood that as the hull is submerged, the water pressure upon the upper surface of the piston 17 increases, and in opposition to the spring 18, tends to move the front end of the fin J towards a horizontal position. Hence, it will be seen that when springs of proper power and suitably adjusted are employed, the fins will be automatically held in such position that their inclination will maintain the hull, when traveling at a predetermined speed, at a predetermined depth in the water. If, however, the hull should sink to a greater depth, the increase of the water pressure upon the upper surface of the pistons 17 will correspondingly move upward the front ends of the fins J and allow the hull to rise. It will be understood, of course, that the buoyancy of the hull will be so regulated that when the fins J are in horizontal position, the hull will rise to the surface of the water and that a downward inclination of the front ends of the fins is necessary to effect a continued submergence of the hull while it is moving forward.

The fins J will be arranged at a point slightly below the level of the deck a, as in such position they will more effectively serve in controlling the depth of travel of the hull, and when arranged in such position they can be conveniently applied to the existing freight carrier hulls and without interfering materially with the storage space. The fins J will project outwardly above the surface of the water when the hull is traveling on the surface, as indicated in Fig. 2.

When the hull is to be submerged so that it may travel below the surface of the water, as indicated in Fig. 3 of the drawings, water will be admitted to the water tanks in usual manner until the hull so far sinks that the fins J will be brought below the surface of the water. The front ends of the fins J will then be turned downwardly, and as the hull is driven forward by its propeller, the fins will serve to increase the submergence of the hull until it has reached the required depth; and at such depth it may be maintained either under the control of the operator on the working platform R, or automatically, as hereinbefore described. When it is desired to quickly bring the hull to the surface, the operator can turn the shaft sections j, j' so as to upwardly incline the front portions of the fins J and when thus inclined, the fins J will serve to expedite the movement of the hull towards the surface as the hull is propelled in forward direction. A ship equipped with my invention may travel either afloat or submerged for a length of time dependent only upon its fuel supply and when submerged will be practically free from the strains incident to wave action and will be measureably free from the danger of attack by submarine war craft because the hull is hidden and the smokestack disguised. When in quiet water and outside the danger zone, the ship is adapted to travel on the surface in the ordinary manner.

The details of construction above set forth may be varied within wide limits without departing from the spirit of the invention and features of the invention may be employed without its adoption as an entirety.

What I claim as new and desire to secure by Letters Patent is:—

1. A cargo ship adapted for surface and submarine navigation, having a single power propulsion plant and having pipes open at their tops and of such length as to permit the ship to travel submerged to the area of still water, with such pipes extending above the water surface and of such size as to afford at all times a copious supply of fresh air and discharge of products of combustion and foul air.

2. A cargo ship adapted for surface and submarine navigation, having a single power propulsion plant and having an elongated stack for admission of fresh air and a smokepipe enclosed within said stack, said stack and pipe being of such length as to permit the ship to travel submerged with said pipes extending above the water surface and of such size as to afford a copious supply of fresh air and discharge of products of combustion and foul air.

3. A cargo ship adapted for surface and submarine navigation, having a single power propulsion plant and having an elongated stack of oval shape with its major axis extending lengthwise of the ship, and a smokepipe within said stack, said stack and pipe being of such length as to extend above the water surface when the ship is traveling submerged and of such size as to afford at all times a copious supply of fresh air and to insure discharge of products of combustion and foul air.

4. The combination with the hull of a submersible cargo ship having a propeller located adjacent its keel, of fins for varying the degree of submergence of said hull, located at the sides and near the upper part of said hull, means for controlling said fins, and open-ended elongated pipes for admission of fresh air and discharge of products of combustion and foul air, rising above the deck of said hull and adapted to project above the surface of the water when the hull is traveling submerged.

WILLIAM M. LE MOYNE.